United States Patent Office 2,825,714
Patented Mar. 4, 1958

2,825,714

DERIVATIVES OF LINEAR POLYMERIC AMINES AND METHODS OF PRODUCING THEM

Sidney Melamed, Philadelphia, Pa., assignor to Rohm & Haas Company, Philadelphia, Pa., a corporation of Delaware No Drawing. Application November 12, 1954
Serial No. 468,523

17 Claims. (Cl. 260—72)

The present invention relates to polymeric amino acids of linear character, their salts, esters, and amides and to methods of producing them.

The polymers of the present invention contain from one to 100 mole percent, and preferably at least 20 mole percent, of units having the structure of Formula I:

I

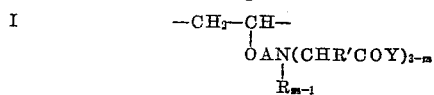

where A is an alkylene group of 2 to 18 carbon atoms having at least two of such carbon atoms in a chain separating the ether oxygen and amino nitrogen, $m$ is an integer having a value of 1 to 2, R is H, or an alkyl group of 1 to 12 carbon atoms including cyclohexyl, R' is H or methyl, Y is OH, OM, OR$^2$, or NR$^3$R$^4$ in which M is a metal, especially an alkali metal, such as Na, K, Li, or an alkaline earth metal, such as Ca, Ba, Mg, Sr, R$^2$ is benzyl, phenoxyethyl, allyl, or an alkyl group having 1 to 12 carbon atoms, R$^3$ is H or an alkyl group of 1 to 12 carbon atoms including cyclohexyl, and R$^4$ is H or an alkyl group of 1 to 12 carbon atoms including cyclohexyl.

Preferred polymers are those containing 60 to 100 mole percent of units having the Formula II:

II

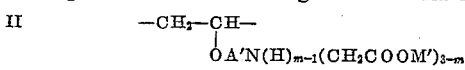

where A' is an alkylene group of 2 to 3 carbon atoms, $m$ is 1 or 2 and M' is H or an alkali metal.

These preferred polymers have outstanding chelating action.

Various ways may be used for producing these polymeric amines containing carboxylic acid, carboxylic acid salt, ester or amide groups. In the simplest fashion, the polymers may be obtained by the polymerization or copolymerization of one or more amines having the structure of Formula III.

III     $CH_2=CHOANHR$ where A and R have the definitions given above, optionally with one or more other monoethylenically unsaturated compounds, and subsequently reacting the polymer obtained with a compound having the structure of Formula IV:

IV     ClCHR'COY in which R' and Y are as defined above. The proportion of compound IV may be varied widely, the minimum being the molar equivalent of a single amino unit of the polymer so as to provide for the replacement of at least one hydrogen atom on at least one nitrogen atom of the polymer when the polymer has an average degree of polymerization of 100. This minimum proportion may be correspondingly higher or lower as the average degree of polymerization is higher or lower so as to provide at least one mole percent of units reacted with the compound of Formula IV. Preferably sufficient reactant of Formula IV is employed to react with 20 mole percent or more of the units in the polymer and, in the preparation of chelating compounds of the preferred group mentioned above, from 80 to 100% of the amine containing units of the polymer are reacted with 1 or 2 moles of the compound of Formula IV. Instead of reacting the polymer with the compounds of Formula IV, it may be reacted wih a chloromethylnitrile (ClCH$_2$CN), glycolonitrile (HOCH$_2$CN), or it may be reacted with formaldehyde and hydrogen cyanide as described in more detail hereinafter. After such reaction which substitutes a (—CH$_2$CN) group for one or both hydrogens on the nitrogen atoms of the polymer, the nitrile groups may be hydrolyzed such as in alkaline medium to produce either amide groups or carboxylic acid or carboxylic acid salt groups.

Examples of specific amines that may be employed in the polymerization or copolymerization are as follows:

$CH_2=CHOCH_2CH_2NH_2$
$CH_2=CHOCH_2CH_2NHCH_3$
$CH_2=CHOCH_2CH_2CH_2NH_2$
$CH_2=CHOCH_2CH(CH_3)NH_2$
$CH_2=CHOCH(CH_3)CH_2NH_2$
$CH_2=CHOCH_2C(CH_3)_2NH_2$
$CH_2=CHOC(CH_3)_2CH_2NH_2$
$CH_2=CHOCH_2CH_2CH_2CH_2NH_2$
$CH_2=CHOC(CH_3)_2CH_2CH(CH_3)NH_2$
$CH_2=CHOCH_2CH_2CH(CH_3)(CH_2)_3C(CH_3)_2NH_2$
$CH_2=CHOCH_2C(CH_3)_2CH_2NH_2$
$CH_2=CHOCH_2CH(CH_3)NHCH_3$
$CH_2=CHOC_2H_4NHC_4H_9$
$CH_2=CHOCH(CH_3)CH_2NHC_2H_5$
$CH_2=CHOCH_2CH(CH_3)NHC_6H_{11}$
$CH_2=CHOC_2H_4NHC_{12}H_{25}$
$CH_2=CHOCH(C_4H_9)CH_2NH_2$
$CH_2=CHOCH_2CH(C_2H_5)NH_2$
$CH_2=CHOCH(CH_2=CH)CH_2NH_2$
$CH_2=CHOCH(C_6H_{11})CH_2NH_2$
$CH_2=CHOCH(C_8H_{17})CH_2NH_2$
$CH_2=CHOCH(C_{12}H_{25})CH_2NH_2$
$CH_2=CHOCH(C_{16}H_{33})CH_2NH_2$

These aminoalkyl vinyl ethers may be obtained by the reaction of acetylene in the presence of a basic catalyst on aminoalcohols of Formula V.

V     HOANHR where A and R are defined above. The reaction is readily carried out in the presence of a small amount (5% to 10%) of an alkali metal hydroxide, such as potassium hydroxide, as catalyst. Acetylene is passed into the alcohol at 100 to 180° C. under pressures of 200 to 500 lbs./sq. in. gage. The vinyl ethers thus formed are separated by distilling under reduced pressure. The polymerization or copolymerization of the aminoalkyl vinyl ether to form homopolymers, copolymers containing two or more such ethers, or copolymers of one or more of the ethers with other types of monoethylenically unsaturated compounds to form linear polymers and copolymers, is preferably effected in the presence of an acyclic azo compound. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis(α,γ-dimethylvaleronitrile), azobis(α-methylbutyronitrile), azobis(α-methylvaleronitrile), dimethyl azobismethylvalerate, and the like. In these catalysts one of the carbons bonded to the tertiary carbon atom has its remaining valences satisfied by at least one element from the class consisting of oxygen and nitrogen.

To effect polymerization the aminoalkyl vinyl ether and the acyclic azo catalyst are mixed directly or in the presence of an inert solvent and the mixture is maintained between 60° and 100° C. until the desired extent of polymerization is attained. For water-soluble aminoalkyl vinyl ethers water may serve as solvent, if desired. Other solvents include methanol, ethanol, isopropanol, butanol, dimethylformamide, benzene, toluene, ethyl acetate, etc. The amount of catalyst may be varied from about 0.1% to about 15% of the weight of the aminoalkyl vinyl ether. The polymerization is best carried out in an inert atmosphere such as nitrogen gas. For polymerization in solution concentrations of monomer from about 50% to about 90% are generally desirable. The course of polymerization may be readily followed from the increase in viscosity of the solution. The catalyst may be added in increments, if desired, with or without additional solvent.

The other monoethylenically unsaturated compounds which may be copolymerized with the aminoalkyl vinyl ethers include vinylidene halides such as vinyl fluoride, 1,1-difluoroethylene; vinylidene hydrocarbons such as isobutylene, 1,3-butadiene, styrene; halovinylidene hydrocarbons such as 2-fluoro-1,3-butadiene; N-vinyl imides such as N-vinylphthalimide; unsaturated ethers such as vinyl ethyl ether; other vinyl monomers such as vinylpyridine, N-vinylcaprolactam, N-vinylethylene urea, N-vinyloxyethylethylene urea, formamidoethyl vinyl ether; and other polymerizable or copolymerizable unsaturates such as tetrafluoroethylene, allylurea, ethyl N-allylcarbamate, and the like. Two or more vinylidene monomers may be copolymerized with the unsaturated ethers and esters of this invention.

When the aminoalkyl vinyl ether is homopolymerized, it is frequently desirable to use from 10% to 15% of the azo catalyst and molecular weights of 1000 to 1500 are readily obtainable. Higher molecular weight polymers and a wider variety of copolymers may be obtained when the monomeric aminoalkyl vinyl ether is first reacted with esters, such as methyl formate or methyl acetate, to convert the amino groups of the monomer to an amido group. The resulting amidoalkyl vinyl ether, such as the formamidoalkyl vinyl ether or acetamidoalkyl vinyl ether may then be polymerized alone or with other monoethylenically unsaturated monomers in the presence of 1% to 2% azo catalyst under the conditions generally outlined above for the polymerization of the aminoalkyl vinyl ethers. Polymers of molecular weights averaging 5,000 to 10,000 or higher are thus readily obtained or lower molecular weights of 1,000 to 5,000 may be obtained if larger proportions of catalyst are employed. Copolymers may even have molecular weights of 100,000 or higher, especially when lower proportions of acylamidoalkyl vinyl ether, such as from 1 to 5 mole percent thereof, are used. The comonomers that may be used with the acylamidoalkyl vinyl ether may be any of those listed above besides acrylic or methacrylic acid, their esters, amides, or nitriles which cannot be copolymerized with the aminoalkyl vinyl ether directly because of addition across the double bond of the acrylic comonomer. Thus, the acylamidoalkyl vinyl ether may be copolymerized with acrylic, haloacrylic and alkacrylic acids, esters, nitriles and amides such as acrylic acid, methacrylic acid, alpha-chloroacrylic acid, methyl acrylate, ethyl acrylate, methyl metharylate, butyl methacrylate, methoxymethyl methacrylate, chloroethyl methacrylate, beta-diethylaminoethyl methacrylate, acrylonitrile, methacrylonitrile, acrylamide, methacrylamide; vinyl carboxylates such as vinyl formate, vinyl acetate, vinyl chloroacetate, vinyl butyrate, vinyl laurate; and so on, and subsequently the acylamido groups in the copolymer may be hydrolyzed under alkaline conditions to the free amino group. Partial or complete hydrolysis may also be effected of the acylamido groups in homopolymers thereby producing polymers as well as copolymers of the aminoalkyl vinyl ethers of Formula III above.

Regardless of the method of producing the polymer, it is then reacted with a compound of Formula IV above. For example, $\alpha$-chloroacetic acid or an alkali metal salt thereof, such as sodium chloroacetate may be reacted with the polymer in aqueous medium at a temperature of 0 to 100° C. for a period of ½ to 8 hours. When the acid is used, an alkali, such as sodium hydroxide or sodium carbonate, is present. Also, when the sodium $\alpha$-chloroacetate is used, additional alkali, such as sodium hydroxide or sodium carbonate, may be employed if the salt of the polymer is desired as the end product. Of course, the use of other metal salts or other alkaline materials may be resorted to for producing other metallic salts of the carboxyl-containing polymer.

To produce the esters or amides of Formula I, the linear polymeric aminoalkyl vinyl ether may be reacted with an ester of $\alpha$-chloracetic acid or of $\alpha$-chloropropionic acid, such as the methyl, ethyl or any other alkyl ester thereof or it may be reacted with the amide or an N-substituted amide of $\alpha$-chloroacetic acid or of $\alpha$-chloropropionic acid, such as $\alpha$-chloroacetamide, or N,N-dimethyl-$\alpha$-chloroacetamide. This reaction is carried out under anhydrous conditions such as in ether, dioxane, toluene, benzene, or xylene, in the presence of an alkali, such as powdered potassium hydroxide or powdered sodium hydroxide suspended in the solvent. Thus, the powdered alkali may be dispersed in the solvent with agitation, the polymer may be added and then the chlorine-containing ester or amide of Formula IV may be added at temperatures of 0 to 20° C., preferably about 0 to 10° C. for a period of ½ to 8 hours. An amine acceptor, such as pyridine, may be used as an acceptor for the hydrogen chloride liberated. The resulting polymers may be employed as such or they may be used as intermediates to form the carboxyl-containing polymers of the invention or the salts thereof. For this purpose, they may be hydrolyzed in the presence of an alkali at temperatures of 30° to 100° C.

To produce the amides or the acids or carboxylic acid salts of Formula I, the polymer of an aminoalkyl vinyl ether of Formula III may be reacted with chloromethylnitrile, glycolonitrile, or first with formaldehyde and then with hydrogen cyanide and the products obtained may be hydrolyzed to the free carboxylic acid or the metal salt thereof. Reaction with chloromethylnitrile is effected under the same conditions as were described above when the reaction is effected with an ester or an amide of an $\alpha$-chloroacetic or propionic acid; namely, in an anhydrous solvent in which caustic soda or potash is suspended at temperatures of 0 to 20° C. and preferably 0 to 10° C. for a period of ½ to 8 hours. The reaction with glycolonitrile occurs at room temperature, an exotherm developing upon the mere mixing of the polymer with the glycolonitrile in aqueous solution. The addition of formaldehyde to the polymeric amine in the cold in aqueous solution causes reaction with the production of methylol substituted nitrogen-containing groups which, in turn, react with hydrogen cyanide to produce either —$NHCH_2CN$ or —$N(CH_2CN)_2$. The order of addition may be reversed, namely, the hydrogen cyanide may first be added to the aqueous solution of the polymer after which formaldehyde may be added with substantially the same result. The nitriles obtained in any of these three processes may then be hydrolyzed in alkaline condition at elevated temperatures to form the amide or carboxylic acid or carboxylic acid salt of Formula I.

The products of the present invention may be used in the medium in which they are produced or they may be concentrated therein or isolated therefrom. The esters or amides are generally soluble in common organic solvents, such as methanol, ethanol, acetone, ether, dioxane, dimethylformamide or dimethylacetamide and impurities may be removed from such solutions by mere filtration, after which the polymeric product may be concentrated or dried by evaporation of the solvent. When the product is the free carboxylic acid or salt thereof and particularly an alkali metal salt, such as sodium, soluble inorganic impurities may be removed by dialysis of the reaction medium and the resulting aqueous polymer solution may be concentrated by evaporation of water. The addition of acid or base may be resorted to for the purpose of converting the carboxylic acid salt or the free acid respectively by ion-exchange to the free carboxylic acid form or the metal salt form of the polymer.

The products of this invention are characterized in one respect of being addition polymers. This characteristic has been shown to impart valuable properties to the products and is essential in applications involving lack of diffusibility, non-volatility, permanence, ability to form films, coatings, membranes and the like and to impart similar valuable properties associated with vinyl polymers in general.

The products of this invention are particularly valuable and novel from yet another standpoint, namely availability and ease of preparation. The monomers, aminoalkyl vinyl ethers, are readily prepared in good yields from inexpensive raw materials. The monomers polymerize or copolymerize readily to a wide range of compositions. The formamido- and acetamido-ethyl vinyl ether monomers are not chain-transfer agents and can yield high molecular weight polymers.

The products of the invention, when a single hydrogen on the amino nitrogen of a polymer unit is replaced with the —CHR'COY group of the present invention, may be considered a substituted derivative of glycine or of a glycine ester or amide. When two hydrogens on the amino nitrogen of the polymer unit is replaced with two such groups, the product may be considered a substituted imino-diacetic acid or an ester or an amide thereof. The compounds of the present invention are of linear character and have, as the main backbone of the polymer, a carbon-to-carbon chain exclusive of other atoms except at the two ends of the polymer. The substituted glycine or iminoacetic acid groups are attached to alkyl ether branch chains of the polymer. This disposition apparently accounts for the high capacity of chelation of the polymers even when they are of extremely high molecular weight. Apparently the presence of the amino portion of the chelating group near the outer end of the chain and entirely away from the linear backbone of the polymer renders the amino portion more available to take part in chelation than if the nitrogen atom were present in the linear backbone of the polymer.

The polymers of the present invention have a wide field of utility. The acids and salts are useful as dispersants in aqueous systems especially when they have a molecular weight averaging from about 1,000 to 2,000. Because of their chelating capacity, the acid and salt form of the polymers are useful to sequester metal ions in the presence of other materials which would normally precipitate such metal ions. Thus the addition of the acid or salt form of the polymers of the present invention to soap or to aqueous media containing soap prevents the precipitation of the insoluble calcium, magnesium and the like salts of fatty acids. In this capacity, the polymers may be incorporated in the spinning solutions or baths used for the formation of artificial fibers or filaments, they may be administered intravenously or orally for sequestering metal ions, such as sodium; they may be incorporated in plants by injection; they may be mixed with soil as a conditioning medium to improve the tilth thereof for the growing of crops. The polymers of the present invention in their acid or salt forms are also useful in the leather and textile industries, in cosmetic and soap compositions, polishes, glass and metal cleaning preparations, as antioxidants, as additives to lubricants and in numerous other applications for which metal ion chelating and sequestering agents are generally useful. The acid and salt forms of the polymers of the present invention may also be incorporated into spinning solutions, such as of cellulose acetate for inhibiting the gas-fading of dyed products thereof. They may be incorporated in spinning solutions, especially of polymers or copolymers of acrylonitrile containing at least 75% of acrylonitrile for the purpose of imparting greater dye-receptivity to fibers, filaments or films formed therefrom, especially to acid or wool dyes. The acid and salt forms of the polymers of the present invention are also useful as bactericides and fungicides.

The esters and amides are also useful as antioxidants such as for lubricating oils, antifreezes, and hydraulic fluids and in connection with unsaturated oils or fats where they inhibit the formation of peroxide groups, such as in fatliquoring compositions. The esters and amides of the present invention are also useful as plasticizers for various materials, especially cellulose esters such as cellulose acetate or cellulose acetate butyrate, for acrylonitrile polymers and copolymers, such as the copolymers containing 75% to 95% acrylonitrile and the remainder of vinyl acetate or a mixture of vinyl acetate with vinyl pyridine, polystyrene, polyvinyl acetate and polyvinyl acetals. The esters and amides may, therefore, be added to spinning solutions or film-forming solutions as plasticizers, dye-acceptance modifiers, or for the purpose of inhibiting gas-fading of dyed products obtained from such solutions whether they contain cellulose esters or vinyl resin polymers. The fact that the compounds of the present invention have high molecular weight imparts film-forming character to them and thereby improves their compatibility and retention with the main film-forming material with which they are used. The esters and amides may also be used as basic catalysts for thermosetting polymeric compositions, such as polyepoxides, phenol-formaldehyde condensates, and polyesterisocyanates, such as the condensation product of a hydroxyl-terminated linear polyester (e. g., polyethylene glycol terephthalate) with a diisocyanate, such as tolylene diisocyanate. The compounds of the invention are especially useful for this purpose because of their solubility in aqueous or alcoholic media and the fact that they are non-volatile weak bases.

The salt or free acid form of the polymers of the present invention may be incorporated in sheets of polyvinyl acetate, cellulose acetate, or regenerated cellulose either by the spinning of a solution containing the main film-former with the chelating polymer of the present invention or by milling the polymer of the present invention into the main membrane forming polymeric material which, in the last case, may be any of those mentioned or polyethylene or polytetrafluoroethylene. The result is a valuable permselective membrane in which the chelating agent of the present invention is prevented from diffusing out of the membrane because of its high molecular weight.

The following examples are illustrative of the present invention:

*Example 1*

(a) A solution of 4 g. of polyvinyloxyethylamine (mol. wt. about 1,500) in 4 g. of water is treated with 3.6 g. of sodium α-chloroacetate and heated at 90° C. for 30 minutes. The resultant red, viscous solution is thixotropic and behaves as a sequestrant when added to soap solution and titrated with a copper sulfate solution. The polymer is insoluble in alcohols, acetone and dimethylformamide but is soluble in ethylene glycol or acetic acid.

(b) A similar reaction with 2 moles of the chloroacetate to each of the amine units of the polymer gives an alcohol-insoluble, water-soluble product, useful as a sequestrant.

*Example 2*

To a solution of 18.6 g. (0.214 mole) of polyvinyloxyethylamine (molecular weight 1,500) in 20 ml. of water, there is added slowly 41.5 g. of 36.1% aqueous formaldehyde (0.5 mole). The suspension of precipitated polymer in water is treated with 13.5 g. (19.5 ml., 0.5 mole) of liquid hydrogen cyanide. An exotherm is observed and the appearance of the solid changes noticeably. The solid is apparently soluble in ethanol. Then 50 ml. of ethanol and 80 g. of 25% caustic are added slowly and the mixture is heated under reflux until clear (8 hours). The deep red basic solution obtained shows excellent sequestrant activity. It has a sequestering or chelating capacity to take up the cations produced in water by 0.151 gram of $CaCO_3$ per gram of the polymer as measured by using ammonium oxalate as an indicator.

*Example 3*

The procedure of Example 1(b) is followed except that the starting amine-containing polymer is replaced with a copolymer of 60 mole percent of vinyloxyethylamine and 40 mole percent of methyl methacrylate. The product is useful as a sequestering agent.

*Example 4*

The procedure of Example 1(b) is followed with the polymeric amine replaced by a copolymer of 80 mole percent of vinyloxypropylamine and 20 mole percent of butyl acrylate. The product is useful as a chelating agent.

*Example 5*

The procedure of Example 1 is followed with a homopolymer of butylaminoethyl vinyl ether using a molecular equivalent amount of sodium α-chloroacetate to the amine groups of the polymer.

*Example 6*

(a) Polyvinyloxyethylamine having an average molecular weight of about 1,500 is reacted with N,N-diethyl-α-chloroacetamide using two moles of the latter per amine unit of the polymer. The resulting polymeric product is added to a 20% solution in dimethylformamide of a copolymer of 90% acrylonitrile with 10% vinyl acetate in an amount of 5% on the weight of the copolymer. The fibers, films and other articles produced from the spinning solution have increased receptivity toward acid dyes.

(b) The product obtained in part (a) hereof is hydrolyzed by adding 5 grams of sodium hydroxide per 100 cc. of the reaction medium and heating the solution at reflux. The product obtained is useful as a sequestering agent.

*Example 7*

The procedure of Example 1(b) is followed except that the starting polymer is replaced by one of the following in each of three successive runs:

(a) Homopolymer of $CH_2=CHOCH(C_{16}H_{33})CH_2NH_2$
(b) Homopolymer of $CH_2=CHOCH_2CH_2NHC_6H_{11}$
(c) Homopolymer of
$CH_2=CHOC_2H_4CH(CH_3)(CH_2)_3C(CH_3)_2NH_2$ Each of the products obtained is added in amounts of 5% (by weight of acrylonitrile polymer) to a solution containing 20% of a copolymer of 85% of acrylonitrile with 15% of vinyl acetate in dimethylformamide. The fibers obtained by spinning the solutions into aqueous media show improved receptiveness toward wool dyes as compared to the acrylonitrile polymer fibers obtained without the addition of the products of the present invention.

*Example 8*

In 100 cc. of dioxane, 20 grams of a homopolymer of 2-aminocyclohexylethyl vinyl ether are dissolved. Three grams of pulverized sodium hydroxide are dispersed in the dioxane with agitation. Gradually there is added 40 grams of butyl-α-chloropropionate. The temperature is maintained at about 10° C. during the addition and for a period of six hours thereafter. The product remains dissolved in the dioxane and insoluble impurities are removed by filtration. To 100 grams of a 15% solution of cellulose acetate in dioxane, 10 cc. of the product (containing approximately 50% of the polymeric ester) are added. The resulting solution is cast into films, sheets and other articles which retain their flexibility over long periods of time.

It is to be understood that changes and variations may be made without departing from the spirit and scope of the invention as defined in the appended claims.

We claim:

1. A composition of matter comprising a polymer comprising from 1 to 100 mole percent of units having the Formula I:

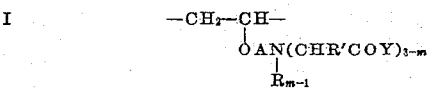

where A is an alkylene group of 2 to 18 carbon atoms having at least two of such carbon atoms in a chain separating the ether oxygen and amino nitrogen, $m$ is an integer having a value of 1 to 2, R is selected from the group consisting of H, cyclohexyl, and alkyl groups of 1 to 12 carbon atoms, R' is selected from the group consisting of H and methyl, Y is selected from the group consisting of OH, OM, $OR^2$, and $NR^3R^4$ in which M is a metal, $R^2$ is selected from the group consisting of benzyl, phenoxyethyl, allyl, and alkyl groups having 1 to 12 carbon atoms, $R^3$ is selected from the group consisting of H, cyclohexyl, and alkyl groups of 1 to 12 carbon atoms, and $R^4$ is selected from the group consisting of H, cyclohexyl, and alkyl groups of 1 to 12 carbon atoms, and 0 to 40 mole percent of units of another ethylenically unsaturated compound.

2. A composition of matter comprising a polymer comprising from 60 to 100 mole percent of units having the Formula II:

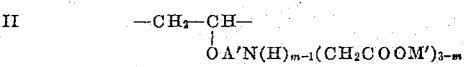

where A' is an alkylene group of 2 to 3 carbon atoms, $m$ is an integer having a value of 1 to 2, and M' is an alkali metal, and 0 to 40 mole percent of units of another ethylenically unsaturated compound.

3. A composition comprising a polymer comprising 60 to 100 mole percent of units having the formula

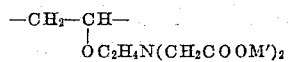

where M' is an alkali metal and 0 to 40 mole percent of units of another ethylenically unsaturated compound.

4. A composition comprising a polymer comprising 60 to 100 mole percent of units having the formula

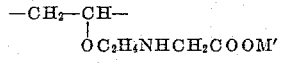

where M' is an alkali metal and 0 to 40 mole percent of units of another ethylenically unsaturated compound.

5. A composition comprising a polymer containing 1 to 100 mole percent of units having the formula

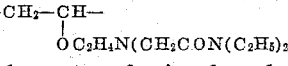

and 0 to 40 mole percent of units of another ethylenically unsaturated compound.

6. A composition comprising a polymer containing 1 to 100 mole percent of units having the formula

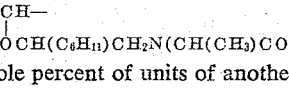

and 0 to 40 mole percent of units of another ethylenically unsaturated compound.

7. A composition of matter comprising a polymer comprising from 60 to 100 mole percent of units having the structure of the formula

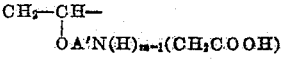

where A' is an alkylene group of 2 to 3 carbon atoms, and $m$ is an integer having a value of 1 to 2, and 0 to 40 mole percent of units of another ethylenically unsaturated compound.

8. A composition comprising a polymer comprising 60 to 100 mole percent of units having the formula $$-CH_2-CH-$$
$$\phantom{-CH_2-}\underset{OC_2H_4N(H_2CCOOH)_2}{|}$$

and 0 to 40 mole percent of units of another ethylenically unsaturated compound.

9. A composition comprising a polymer comprising 60 to 100 mole percent of units having the formula $$-CH_2-CH-$$
$$\phantom{-CH_2-}\underset{OC_2H_4NHCH_2COOH}{|}$$

and 0 to 40 mole percent of units of another ethylenically unsaturated compound.

10. A process comprising mixing in an aqueous medium a polymer containing 1 to 100 mole percent of units of the formula $$-CH_2-CH-$$
$$\phantom{-CH_2-}\underset{OANHR}{|}$$

where A is an alkylene group of 2 to 18 carbon atoms having at least two of such carbon atoms in a chain separating the ether oxygen and amino nitrogen, and R is selected from the group consisting of H, cyclohexyl, and alkyl groups of 1 to 12 carbon atoms, and 0 to 99 mole percent of units of another ethylenically unsaturated compound with a chloroalkyl compound having the Formula V:

V $\qquad$ ClCHR'COY in which R' is selected from the group consisting of H and methyl, and Y is selected from the group consisting of OH, OM, OR², and NR³R⁴ in which M is a metal, R² is selected from the group consisting of benzyl, phenoxyethyl, allyl, and alkyl groups having 1 to 12 carbon atoms, R³ is selected from the group consisting of H, cyclohexyl, and alkyl groups of 1 to 12 carbon atoms, and R⁴ is selected from the group consisting of H, cyclohexyl, and alkyl groups of 1 to 12 carbon atoms, and subsequently recovering from the mixture a polymer containing units of the formula $$-CH_2-CH-$$
$$\phantom{-CH_2-}\underset{\underset{R_{m-1}}{|}}{\overset{}{O}AN(CHR'COY)_{3-m}}$$

wherein $m$ is an integer having a value of 1 to 2 and the other symbols are as defined herein.

11. A process as defined in claim 10 in which the mixing is effected at 0° to 100° C. in the presence of an alkaline material.

12. A process as defined in claim 10 in which the chloroalkyl compound is an alkali metal salt and the mixing is effected at a temperature of 0° to 100° C. in the presence of an alkaline material.

13. A process as defined in claim 10 in which the chloroalkyl compound is a carboxylic acid ester and the mixing is effected at a temperature of 0° to 20° C. in a substantially anhydrous solvent medium.

14. A process as defined in claim 10 in which the chloroalkyl compound is a carboxylic acid amide and the mixing is effected at a temperature of 0° to 20° C. in a substantially anhydrous solvent medium.

15. A process as defined in claim 10 in which the chloroalkyl compound is a carboxylic acid ester and the mixing is effected at a temperature of 0° to 20° C. in a substantially anhydrous solvent medium, said process comprising the additional step of heating the polymeric ester obtained in an alkaline medium to hydrolyze the ester groups.

16. A process as defined in claim 10 in which the chloroalkyl compound is a carboxylic acid amide and the mixing is effected at a temperature of 0° to 20° C. in a substantially anhydrous solvent medium, said process comprising the additional step of heating the polymeric amide obtained in an alkaline medium to hydrolyze the amide groups.

17. A process comprising mixing a polymer containing 1 to 100 mole percent of units having the formula $$-CH_2-CH-$$
$$\phantom{-CH_2-}\underset{OANHR}{|}$$

where A is an alkylene group of 2 to 18 carbon atoms having at least two of such carbon atoms in a chain separating the ether oxygen and amino nitrogen, and R is selected from the group consisting of H, cyclohexyl, and alkyl groups of 1 to 12 carbon atoms, and 0 to 99 mole percent of another ethylenically unsaturated compound with a substance selected from the group consisting of (1) glycolonitrile, (2) chloromethylnitrile, and (3) a mixture of formaldehyde and hydrogen cyanide, then heating the polymeric nitrile obtained to hydrolyze the nitrile groups, and recovering a polymer containing units of the formula $$-CH_2-CH-$$
$$\phantom{-CH_2-}\underset{\underset{R_{m-1}}{|}}{\overset{}{O}AN(CHR'COY)_{3-m}}$$

wherein $m$ is an integer having a value of 1 to 2 and the other symbols are as defined herein.

References Cited in the file of this patent
UNITED STATES PATENTS

| 2,686,173 | Sauer | Aug. 10, 1954 |
| 2,705,228 | Winberg | Mar. 29, 1955 |

FOREIGN PATENTS

| 508,822 | Belgium | Feb. 15, 1952 |